United States Patent
Figurski et al.

Patent Number: 6,157,710
Date of Patent: *Dec. 5, 2000

[54] METHOD AND SYSTEM FOR DISTRIBUTING MESSAGES FROM A SIGNAL TRANSFER POINT TO A PLURALITY OF SERVICE CONTROL POINTS

[75] Inventors: Duane M. Figurski, Hanover Park, Ill.; Ronald Bradley Bell, Plano, Tex.

[73] Assignees: Ameritech Corporation, Hoffman Estates, Ill.; DSC Telecom LP, Plano, Tex.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/188,761

[22] Filed: Nov. 9, 1998

Related U.S. Application Data

[63] Continuation of application No. 08/804,102, Feb. 20, 1997, Pat. No. 5,878,129.

[51] Int. Cl.[7] .............................. H04M 3/10; H04M 7/00
[52] U.S. Cl. .................................. 379/230; 379/9; 379/33
[58] Field of Search .................................. 379/9, 10, 33, 379/207, 219, 220, 221, 229, 230; 370/216, 217, 218, 219, 220, 221, 225, 226, 227, 228, 229, 230, 235, 236

[56] References Cited

U.S. PATENT DOCUMENTS

| | | |
|---|---|---|
| 5,084,816 | 1/1992 | Boese et al. . |
| 5,089,954 | 2/1992 | Rago . |
| 5,212,727 | 5/1993 | Ramkumar . |
| 5,377,186 | 12/1994 | Wegner et al. . |
| 5,440,541 | 8/1995 | Iida et al. . |
| 5,452,350 | 9/1995 | Reynolds et al. . |
| 5,499,290 | 3/1996 | Koster . |
| 5,517,562 | 5/1996 | McConnell . |
| 5,570,410 | 10/1996 | Hooshiari .................. 379/32 |
| 5,581,610 | 12/1996 | Hooshiari .................. 379/133 |
| 5,631,948 | 5/1997 | Bartholomew et al. . |
| 5,650,998 | 7/1997 | Angenot et al. ........... 370/225 |
| 5,675,635 | 10/1997 | Vos et al. . |
| 5,680,442 | 10/1997 | Bartholomew et al. . |
| 5,694,463 | 12/1997 | Christie et al. . |
| 5,701,301 | 12/1997 | Weisser, Jr. ............... 370/428 |
| 5,719,930 | 2/1998 | MacDonald et al. . |
| 5,726,972 | 3/1998 | Ferguson ................... 379/230 |
| 5,793,839 | 8/1998 | Farris et al. . |
| 5,802,145 | 9/1998 | Farris et al. .............. 379/230 |
| 5,878,129 | 3/1999 | Figurski et al. .......... 379/230 |
| 5,883,939 | 3/1999 | Friedman et al. ......... 379/9 |
| 5,896,441 | 4/1999 | Akazawa et al. .......... 379/9 |
| 5,940,492 | 8/1999 | Galloway et al. ......... 379/230 |
| 5,949,872 | 9/1999 | Khalil et al. .............. 379/330 |

Primary Examiner—Scott Wolinsky
Attorney, Agent, or Firm—Brinks Hofer Gilson & Lione

[57] ABSTRACT

A signal transfer point distributes a plurality of messages to a plurality of service control points in accordance with a distribution plan. The distribution plan includes each of the service control points. Each of the plurality of messages from the signal transfer point is distributed to a corresponding one of the plurality of service control points in accordance with the distribution plan.

14 Claims, 5 Drawing Sheets

METHOD AND SYSTEM FOR DISTRIBUTING MESSAGES FROM A SIGNAL TRANSFER POINT TO A PLURALITY OF SERVICE CONTROL POINTS

This application is a continuation of U.S. application Ser. No. 08/804,102, filled Feb. 20, 1997 now U.S. Pat. No. 5,878,129, issued Mar. 2, 1999, which is hereby incorporated by reference herein.

TECHNICAL FIELD

The present invention relates to methods and systems for communicating messages from a signal transfer point to a plurality of service control points in a telecommunication system.

BACKGROUND OF THE INVENTION

The Advanced Intelligent Network (AIN) and Intelligent Network (IN) architectures utilize a centrally-located service control point (SCP) to control services on service switching points (SSPs) at local telephone exchanges. Each SSP is capable of implementing a set of functional components for defining one or more telecommunication services. The functional components can include providing a dial tone, collecting digits, and performing number translations for example. Each SCP includes a processor and a database used to direct the SSPs to perform a sequence of functions to provide a desired service. As a result, call control of AIN/IN services is carried out by the centralized SCP rather than at each local exchange.

To afford a complete back-up/fail-safe configuration if an SCP were to fail, SCPs are configured in mated pairs. Typically, each of the SCPs in a mated pair is utilized at 40% occupancy during a peak usage period so that if one SCP were to fail, the other SCP would have the capacity to handle the full load of calls. Here, the functioning SCP would have an occupancy of 80%, which provides a 20% degree of safety for an unexpectedly-high load during the peak usage period.

A shortcoming of this architecture is in the expense of operating mated pairs of functioning SCPs well below their full capacity, typically, each having an occupancy less than or equal to 40%.

BRIEF DESCRIPTION OF THE DRAWINGS

The invention is pointed out with particularity in the appended claims. However, other features of the invention will be best understood by referring to the following detailed description in conjunction with the accompanying drawings in which:

DETAILED DESCRIPTION OF A PREFERRED EMBODIMENT

Embodiments of the present invention distribute messages among a cluster of service control points in accordance with a distribution plan. Advantageously, a fuller utilization of service control point resources is realized in comparison to a mated pair configuration. Additionally, quality of service is not compromised should one of the service control points fail.

Figure 1:
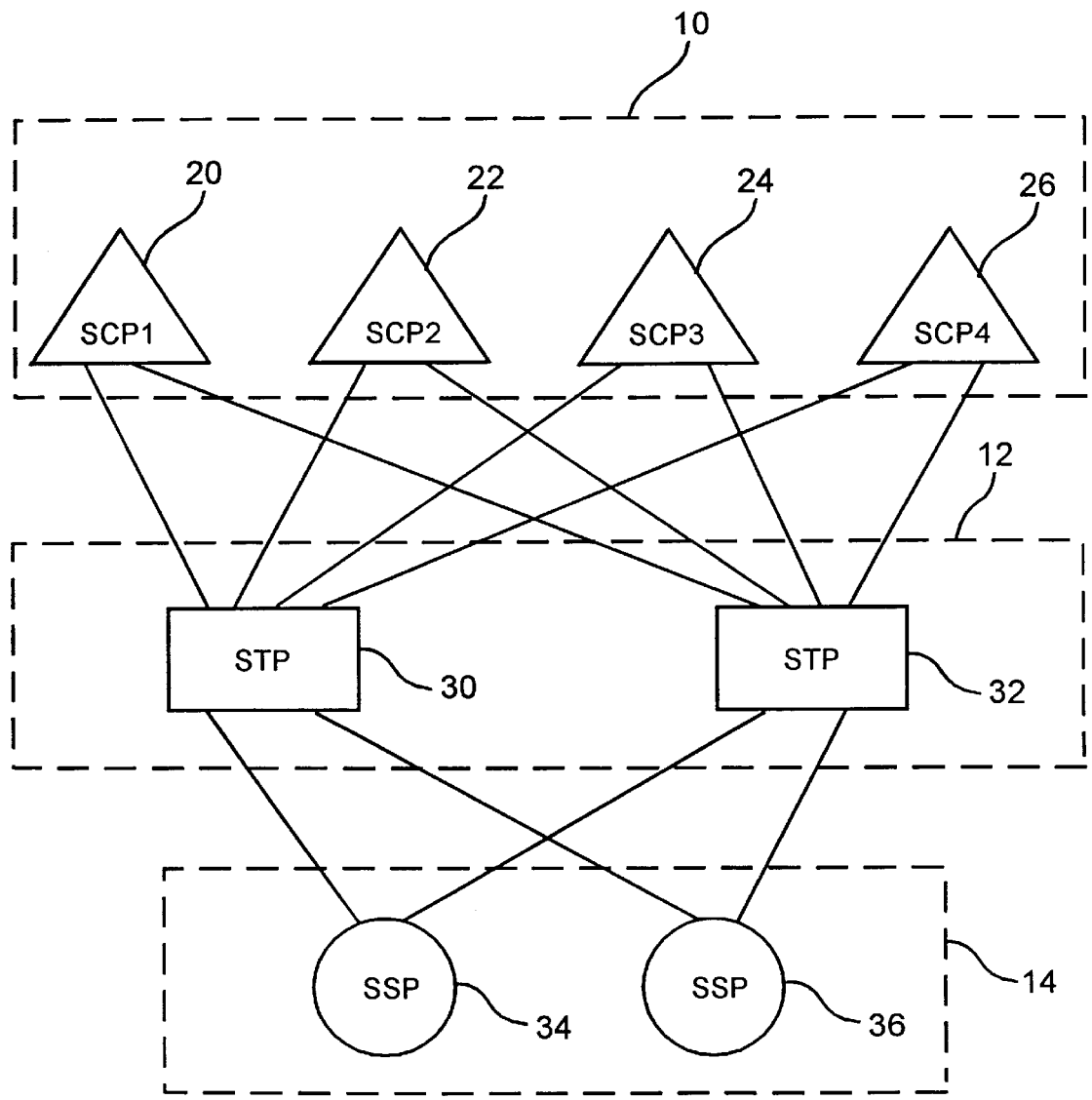
FIG. 1 is a block diagram of an architecture of a portion of a telecommunication system in accordance with the present invention.

FIG. 1 is a block diagram of an architecture of a portion of a telecommunication system in accordance with the present invention. The telecommunication system includes a plurality of service control points 10, a plurality of signal transfer points 12, and a plurality of service switching points 14.

The service switching points 14 intercept calls which require special handling to provide any of a variety of AIN/IN services associated with the call. The service switching points 14 detect an AIN/IN call by recognizing a trigger associated therewith. For these calls, the service switching points 14 send corresponding query messages to the service control points 10 to obtain call handling information to complete each call. Typically, the service switching points 14 are located at central offices, end offices or tandem offices of a public telephone system.

The query messages are communicated from the service switching points 14 to the service control points 10 via the signal transfer points 12. Typically, the signal transfer points 12 are deployed in geographically-separated pairs so that in the event of a disaster at one site, the service switching points 14 can communicate with the service control points 10 via a signal transfer point at another site.

The plurality of service control points 10 provide call handling information in response to the query messages generated by the service switching points 14. Each of the service control points 10 includes a database containing service-specific logic and data for forming a response message containing the call handling information. Response messages containing the call handling information are communicated back to the service switching points 14 via the signal transfer points 12. Each response message instructs a service switching point on how to proceed with a respective AIN/IN call.

Under this architecture, the service control points 10 are organized as a cluster to provide control for calls served by the service switching points 14. The signal transfer points 12 are utilized to distribute the aggregate load of call messages generated by the service switching points 14 over the service control points 10 in the cluster. For maximum flexibility in distributing the calls, it is preferred that each of the signal transfer points 12 be linked to all of the service control points 10.

Each of the signal transfer points 12 distributes each of a plurality of messages to a corresponding one of the plurality of service control points 10 in accordance with a predetermined distribution plan. Various distribution plans, including those specifically described herein, can be utilized to distribute the messages to the service control points 10.

A weighted distribution process allows each service transfer point to distribute query messages based on a weighting factor established for each service control point in the cluster. This process can be accomplished by an algorithm that either counts the number of queries being sent to a specific service control point or maintains a percentage of calls/messages being offered per service control point.

A sequential distribution process sets the service control points 10 in a hierarchy using a list of the service control points 10. Using the list, the service control points 10 are sequentially selected through the cluster for receiving a query message. When the last service control point in the list is reached, the list is recycled from the beginning.

Preferably, the distribution plan utilized to distribute the query messages can be modified through data changes at a translations location in an administration center. These translations can change the data relating to specific service control points utilized in a distribution algorithm and/or change the distribution algorithm itself. For example, with the sequential distribution process, the administrator is capable of changing the sequence order, the start of the sequence, and the end of the sequence.

It is also preferred that a plurality of predetermined distribution plans are available from which an administrator can select a distribution plan. Here, each distribution plan can be assigned a plan number and/or a plan name. Each distribution plan contains the data required to identify and select specific service control points. As a result, when the need arises for changing the distribution plan, the administrator can simply activate a predetermined distribution plan rather than having to build a new distribution plan. For example, the plurality of predetermined distribution plans can include a plurality of different sequences for use in a sequential distribution process. Preferably, the selection process is table-driven for ease of translations input and administration.

Typically, each of the signal transfer points 12 utilizes the same distribution plan for distributing messages among the service control points 10. It is noted, however, that different distribution plans can be simultaneously utilized by the signal transfer points 12 if desired for different clusters.

The selection of the service control points 10 to form the cluster can be made with regard to any of a variety of criteria, including but not limited to, specific services which are to be provided, geographic needs, regulatory requirements, and functional capability. Preferably, the cluster is designed so that total occupancy of any one of the service control points 10 does not exceed the excess occupancy capacity of the remaining service control points. As a result, should any one of the service control points 10 fail, the remaining service control points have the capacity to pick up the excess load of query messages.

For purposes of illustration, four service control points 20, 22, 24, and 26 are illustrated in the cluster. It is noted, however, that the cluster of service control points 10 generally can include any number of service control points. Further, although the portion of the telecommunication system in FIG. 1 is illustrated to include two service switching points 34 and 36, and two signal transfer points 30 and 32, it is noted that any number of service switching points and signal transfer points can be included. Still further, it is noted that a larger portion of the telecommunication system than that illustrated in FIG. 1 would include a plurality of clusters of service control points, wherein each cluster provides operating control for a respective plurality of service switching points.

The service control points 10 in the cluster can be deployed at a single site or at a number of different sites. For example, the service control points 20, 22, 24, and 26 can all be located at a single site. In another example, the service control points 20 and 22 are located at one site, while the service control points 24 and 26 are located at another site. In a further example, the service control point 20 is located at a first site, the service control point 22 is located at a second site, the service control point 24 is located at a third site, and the service control point 26 is located at a fourth site.

The signal transfer points 12 are responsible for recognizing when a service control point is malfunctioning, and for taking corrective action in response thereto. For example, the signal transfer points 12 can be notified by a service control point when a subsystem has failed. In response to recognizing the malfunctioning, each of the signal transfer points 12 can utilize a modified distribution plan which either omits the malfunctioning service control point or reduces the share of messages distributed thereto.

It is preferred that the administration center allow a service control point to be manually taken out of service in a manner which appears as though the service control point has failed. This can be utilized in conditions where a maintenance group wants to take an infrequently-failing service control point out of service. The manual intervention takes on the characteristics of a true failure of the service control point, and hence, the distribution process is automatically modified as preprogrammed per the active distribution plan.

It is further preferred that all changes to the active distribution plan be logged for the purpose of security, maintenance, and analysis. These changes include, but are not limited to, provisioning or translation changes, failure conditions, and maintenance changes.

Further, an alarm indicator can be included should the distribution process be changed because of failure of a service control point. The alarm indicator is capable of recognizing more than one failure in a cluster, and escalating the alarm condition in response thereto.

Figure 2:
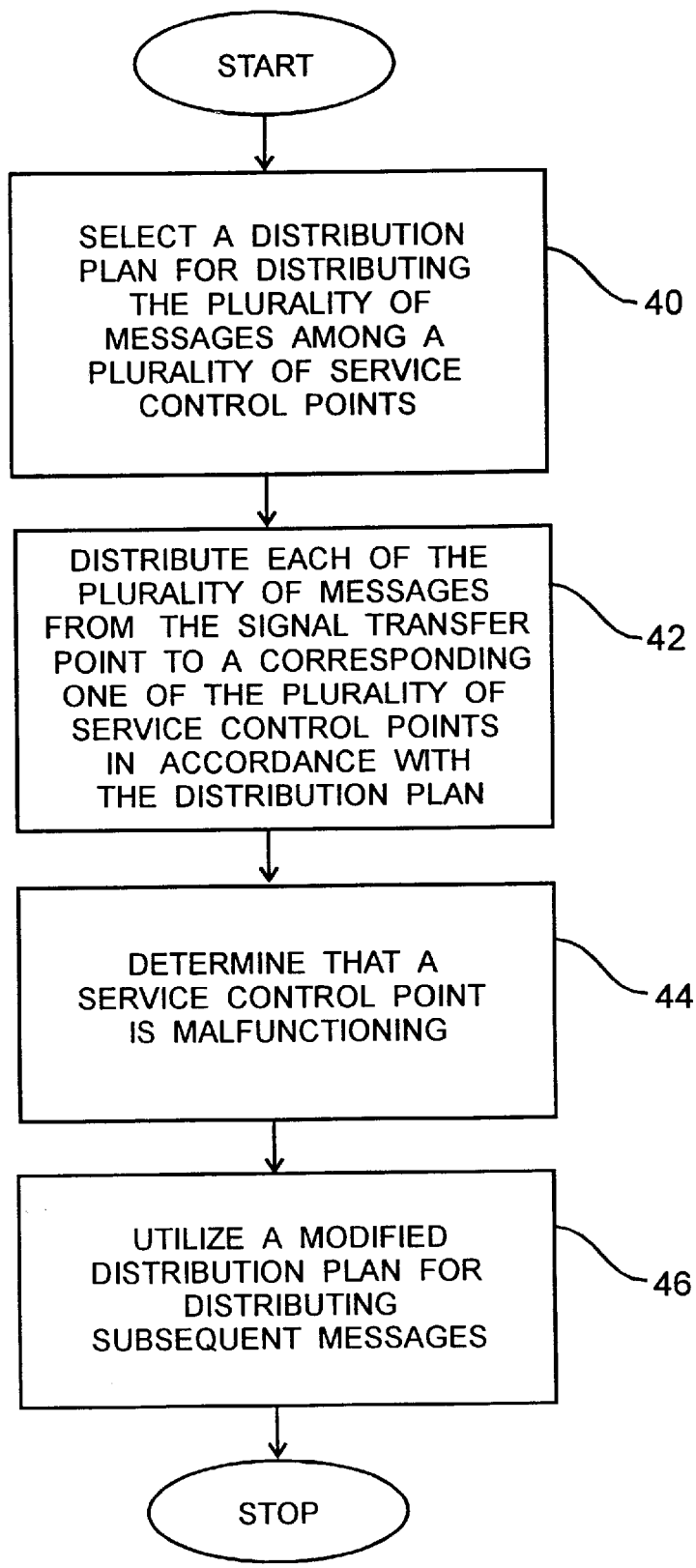
FIG. 2 is a flow chart of an embodiment of a method of distributing a plurality of messages from a signal transfer point to a plurality of service control points in a telecommunication system.

FIG. 2 is a flow chart of an embodiment of a method of distributing a plurality of messages from a signal transfer point to a plurality of service control points in a telecommunication system. The method can be utilized by each of the signal transfer points 12 illustrated in FIG. 1 to distribute messages to the service control points 10 in a predetermined cluster.

As indicated by block 40, the method includes a step of selecting a distribution plan for distributing the plurality of messages among the plurality of service control points. Preferably, the distribution plan is selected from a plurality of predetermined distribution plans. Examples of distribution plans include a sequential selection plan and a weighted selection plan.

In a sequential selection plan, the distribution plan includes a distribution sequence for distributing messages among the service control points. Typically, each of the plurality of service control points is included at least once in the distribution sequence. An equal loading can be produced for each of the service control points by including each of the service control points once and only once in the distribution plan.

In one embodiment of a weighted selection plan, the above-described sequential distribution plan is augmented to include a respective count for each service control point. Here, the respective count of messages is distributed to a service control point before proceeding to a subsequent service control point in the distribution sequence to which messages are distributed.

In another embodiment of a weighted selection plan, the distribution plan includes a respective distribution proportion for each of the service control points. Here, each of the service control points has a proportion of the plurality of messages distributed thereto based upon its respective distribution proportion. The plurality of messages can be distributed either deterministically or stochastically to produce each respective distribution proportion.

As indicated by block 42, the method includes a step of distributing each of the plurality of messages from the signal transfer point to a corresponding one of the plurality of service control points in accordance with the distribution plan. Implementations for performing this step are subsequently described with reference to FIGS. 3 to 5.

As indicated by block 44, the method includes a step of determining that a service control point is malfunctioning. It is noted that the term "malfunction" should be construed to include any degree of loss of function, up to and including a complete loss of function.

The signal transfer point can determine that the service control point is malfunctioning based upon a message received from the service control point. The service control point can be adapted to indicate the severity of its condition in the message. For example, various degrees of severity, from a cautionary message that the service control point is "in trouble" to an alarm message which requests that no messages be distributed to the service control point, can be indicated by the message.

Alternatively, the signal transfer point can determine that the service control point is malfunctioning based upon a duration between transferring a query message thereto and receiving a response message therefrom. If the duration exceeds a predetermined threshold, the signal transfer point can conclude that the service control point is malfunctioning. It is noted that the signal transfer point can detect a malfunctioning service control point when the predetermined threshold is exceeded before receiving a response message.

As indicated by block 46, the method includes a step of utilizing a modified distribution plan for distributing subsequent messages to the service control points once it has been determined that one of the service control points is malfunctioning. Here, for example, the modified distribution plan can exclude the malfunctioning service control point from a distribution sequence included in the distribution plan. As another example, the distribution proportion for the malfunctioning service control point can be reduced, or set to zero, in the modified distribution plan. In turn, the distribution proportion for each of the remaining service control points can be modified to handle the excess load of messages.

Figure 3:
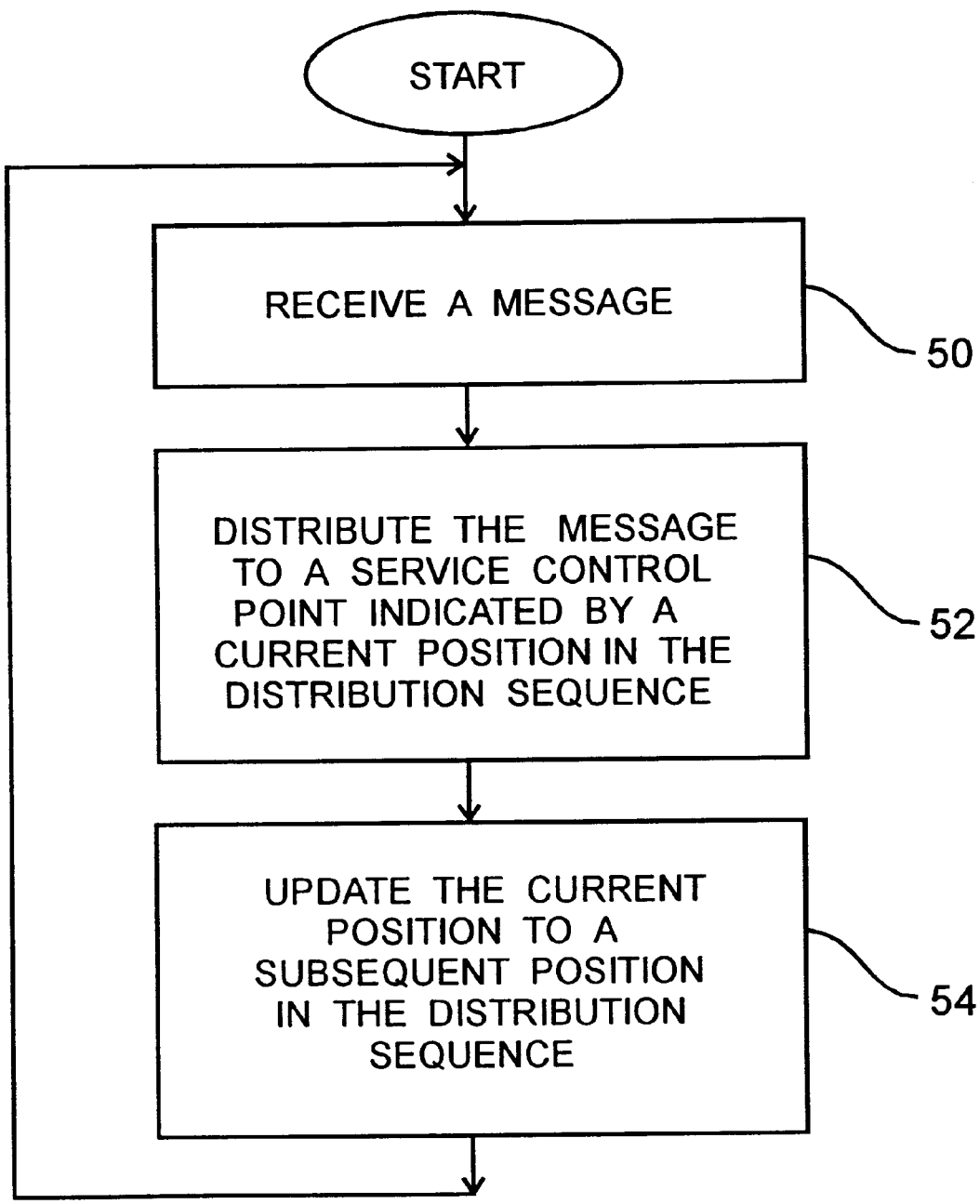
FIG. 3 is a flow chart of an embodiment of a method of distributing each of a plurality of messages from a signal transfer point to a corresponding one of a plurality of service control points in accordance with a sequential distribution plan.

FIG. 3 is a flow chart of an embodiment of a method of distributing each of a plurality of messages from a signal transfer point to a corresponding one of a plurality of service control points in accordance with a sequential distribution plan. The sequential distribution plan includes a distribution sequence which dictates the order in which messages are distributed to the service control points.

As indicated by block 50, the method includes a step of receiving a message from a service switching point. Typically, the message includes a query message which is to be transferred to a service control point for the purpose of obtaining call handling information in a response message. It is noted that the message can be received either directly from the service switching point or from a queue of messages received from the service switching point.

As indicated by block 52, the method includes a step of distributing the message to a service control point indicated by a current position in the distribution sequence. Thereafter, a step of updating the current position to a subsequent position in the distribution sequence is performed, as indicated by block 54.

The current position can be updated by incrementing or decrementing its position within the distribution sequence. After completing the entire distribution sequence, the current position is returned to an initial position so that the distribution sequence can be cycled to distribute subsequent messages.

Flow of the routine is directed back to block 50, at which time a subsequent message is received and to block 52, wherein the subsequent message is distributed to a service control point indicated by the updated position within the distribution sequence. Hence, the steps indicated by blocks 50, 52, and 54 are repeated to distribute the plurality of messages in accordance with the sequential distribution plan.

Table I shows an example of a sequential distribution plan for the portion of the telecommunication system illustrated in FIG. 1. In this example, messages received by a signal transfer point are routed to the service control points 10 in the following order: a first message is routed to the service control point 20; a second message is routed to the service control point 24; a third message is routed to the service control point 22; and a fourth message is routed to the service control point 26. The distribution sequence is cycled for subsequent messages; in particular, a fifth message is routed to the service control point 20, a sixth message is routed to the service control point 24, a seventh message is routed to the service control point 22, and an eighth message is routed to the service control point 26.

As a result, each of the service control points 10 handle a 25% share of the message load. The capacity of the service control points 10 is such that each has an occupancy of approximately 60% during a peak usage period. In general, a sequential distribution plan is well-suited for distributing messages among a cluster of service control points which have equal capacities.

TABLE I

| SEQUENCE | SHARE OF LOAD | OCCUPANCY |
|----------|---------------|-----------|
| SCP1 | ¼ | 60% |
| SCP3 | ¼ | 60% |
| SCP2 | ¼ | 60% |
| SCP4 | ¼ | 60% |

Table II shows an example of a modified distribution plan when the one of the service control points is determined to be malfunctioning. For the purpose of illustration, the service control point 24 is considered to be malfunctioning in this example.

TABLE II

| SEQUENCE | SHARE OF LOAD | OCCUPANCY |
|----------|---------------|-----------|
| SCP1 | ⅓ | 80% |
| SCP3 | — | — |

TABLE II-continued

| SEQUENCE | SHARE OF LOAD | OCCUPANCY |
|---|---|---|
| SCP2 | 1/3 | 80% |
| SCP4 | 1/3 | 80% |

Messages received by the signal transfer point are routed to the service control points 10 as follows: a first message is routed to the service control point 20; a second message is routed to the service control point 22; and a third message is routed to the service control point 26. The distribution sequence is cycled for subsequent messages; in particular, a fourth message is routed to the service control point 20, a fifth message is routed to the service control point 24, and a sixth message is routed to the service control point 22.

Using the modified distribution sequence, each of the functioning service control points 20, 24, and 26 handles one third of the message load when one of the service control points is malfunctioning. Further, the occupancy of each of the functioning service control points 20, 24, and 26 increases to approximately 80% during the peak usage period.

Figure 4:
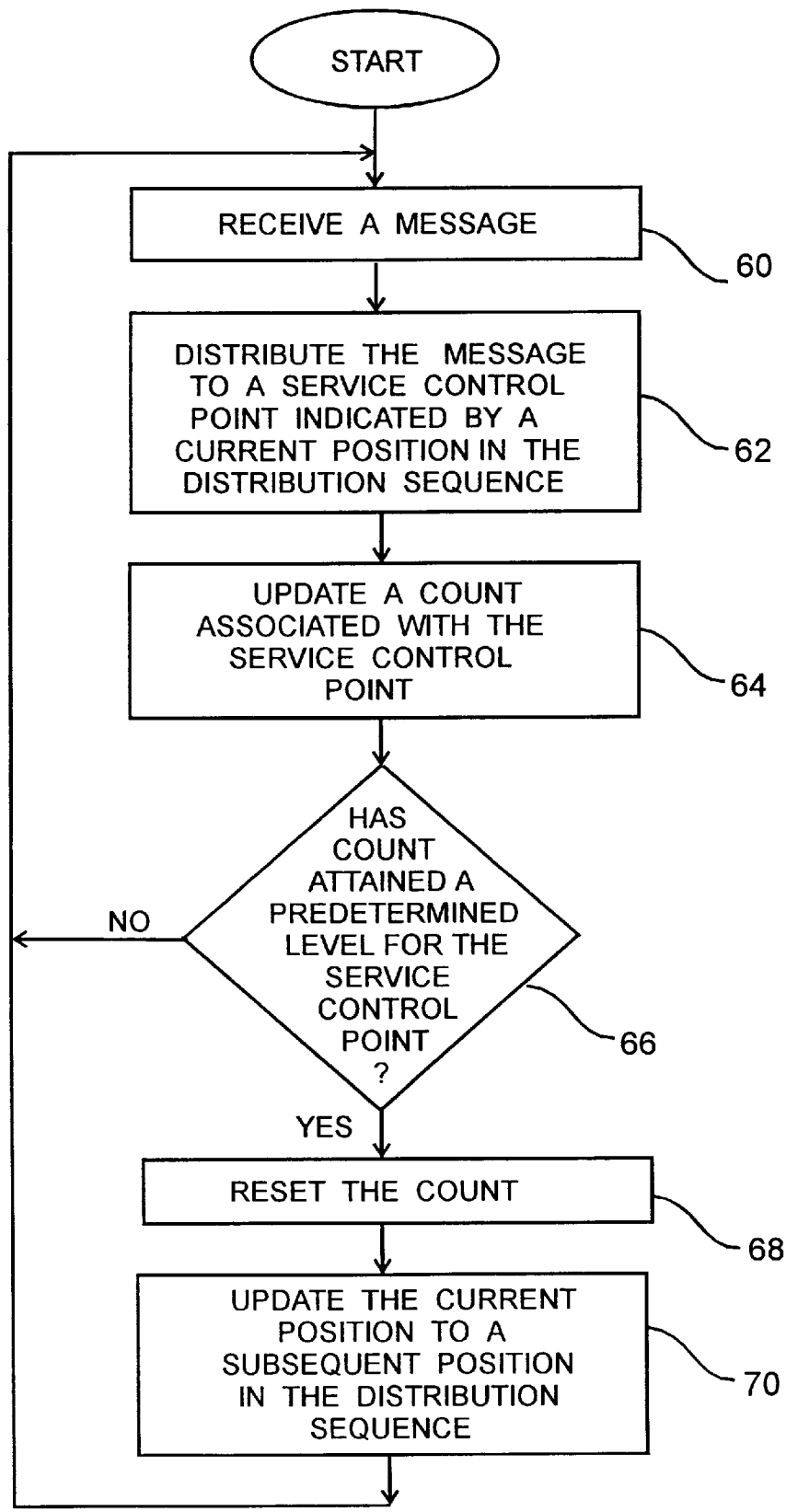
FIG. 4 is a flow chart of an embodiment of a method of distributing each of a plurality of messages from a signal transfer point to a corresponding one of a plurality of service control points in accordance with a weighted, sequential distribution plan.

FIG. 4 is a flow chart of an embodiment of a method of distributing each of a plurality of messages from a signal transfer point to a corresponding one of a plurality of service control points in accordance with a weighted, sequential distribution plan. The weighted, sequential distribution plan includes a distribution sequence which dictates the order in which messages are distributed to the service control points, and a respective number of messages associated with each service control point in the distribution sequence.

As indicated by block 60, the method includes a step of receiving a message from a service switching point. As mentioned earlier, the message typically includes a query message which is to be transferred to a service control point for the purpose of obtaining call handling information in a response message. The message can be received either directly from the service switching point or from a queue of messages received from the service switching point.

As indicated by block 62, the method includes a step of distributing the message to a service control point indicated by a current position in the distribution sequence. A step of updating a count associated with the service control point is performed as indicated by block 64. The count is updated to reflect that the message has been distributed to the service control point. Preferably, the count is indicative of how many messages are received for a particular application (subsystem) at the service control point. A table of counts can be maintained for each application or subsystem over the plurality of service control points.

As indicated by block 66, the method includes a step of determining whether the count has attained the predetermined number of messages for the service control point as dictated by the distribution plan. If so, a step of resetting the count, as indicated by block 68, and a step of updating the current position to a subsequent position in the distribution sequence, as indicated by block 70, are performed. The current position can be updated by incrementing or decrementing its position within the distribution sequence. After completing the entire distribution sequence, the current position is returned to an initial position so that the distribution sequence can be cycled to distribute subsequent messages.

If, in block 66, the count has not attained the predetermined number of messages for the service control point as dictated by the distribution plan, flow of the routine is directed by to block 60. Similarly, after updating the current position in block 70, flow of the routine is directed back to block 60. The above-described steps are then repeated to distribute the plurality of messages in accordance with the weighted, sequential distribution plan.

Table III shows an example of a weighted, sequential distribution plan for the portion of the telecommunication system illustrated in FIG. 1. In this example, messages received by a signal transfer point are routed to the service control points 10 in the following order: seven messages are routed to the service control point 22; three messages are routed to the service control point 20; seven messages are routed to the service control point 24; and three messages are routed to the service control point 26. The distribution sequence is cycled for subsequent messages; in particular, seven messages are routed to the service control point 22, three messages are routed to the service control point 20, seven messages are routed to the service control point 24, and three messages are routed to the service control point 26.

In another preferred approach, messages are initially distributed using the sequence given in Table III. In other words, a first message is routed to the service control point 22, a second message is routed to the service control point 20, a third message is routed to the service control point 24, and a fourth message is routed to the service control point 26. For each of the service control points, a count of the number of messages distributed thereto is maintained. For example, after going through the sequence once, each service control point has a count of one.

The step of routing messages using the sequence is repeated until a count for a service control point has attained its associated count given in Table III. For example, a fifth message is routed to the service control point 22, a sixth message is routed to the service control point 20, a seventh message is routed to the service control point 24, an eighth message is routed to the service control point 26, a ninth message is routed to the service control point 22, a tenth message is routed to the service control point 20, an eleventh message is routed to the service control point 24, and a twelfth message is routed to the service control point 26. At this time, the count associated with the service control point 20 is three and the count associated with the service control point 26 is three.

Thereafter, subsequent messages are routed wherein the service control points 20 and 26 are excluded from the sequence. For example, a thirteenth message is routed to the service control point 22, a fourteenth message is routed to the service control point 24, a fifteenth message is routed to the service control point 22, a sixteenth message is routed to the service control point 24, a seventeenth message is routed to the service control point 22, an eighteenth message is routed to the service control point 24, a nineteenth message is routed to the service control point 22, and a twentieth message is routed to the service control point 24. At this time, the count associated with the service control point 22 is seven and the count associated with the service control point 24 is seven.

Thereafter, the counts associated with the service control points are initialized back to zero, and the process is repeated for subsequent messages.

TABLE III

| SEQUENCE | COUNT | SHARE OF LOAD | OCCUPANCY |
| --- | --- | --- | --- |
| SCP2 | 7 | 35% | 47% |
| SCP1 | 3 | 15% | 60% |
| SCP3 | 7 | 35% | 47% |
| SCP4 | 3 | 15% | 60% |

Using either approach, the service control points 22 and 24 each handle a 35% share of the message load, while the service control points 20 and 26 each handle a 15% share. The capacity of the service control points 10 is such that two have an occupancy of approximately 60% and the other two have an occupancy of approximately 47% during a peak usage period.

In general, a weighted, sequential distribution plan is well-suited for distributing messages among a cluster of service control points which have unequal capacities. For example, the above-described distribution plan is suited for service control points 22 and 24 which are capable of handling 300 transactions per second, and service control points 20 and 26 which are capable of handling 100 transactions per second.

When a service control point is determined to be malfunctioning, its respective count can be modified in a weighted, sequential distribution plan. The count can be reduced to a level commensurate with the severity of the condition of the service control point. For a catastrophic failure of the service control point, the count can be set to zero, or alternatively, the service control point can be removed from the sequence.

Figure 5:
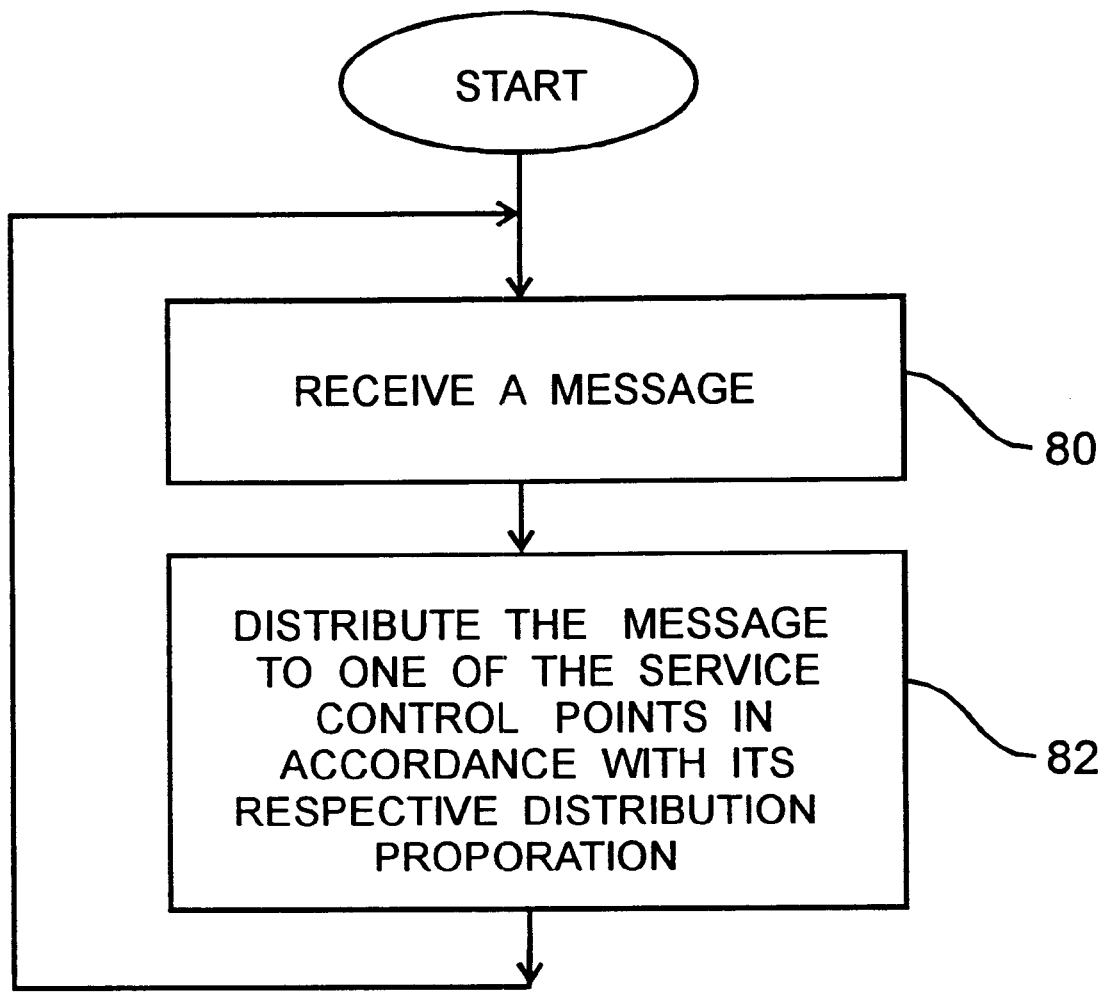
FIG. 5 is a flow chart of an embodiment of a method of distributing each of a plurality of messages from a signal transfer point to a corresponding one of a plurality of service control points in accordance with a weighted distribution plan.

FIG. 5 is a flow chart of an embodiment of a method of distributing each of a plurality of messages from a signal transfer point to a corresponding one of a plurality of service control points in accordance with a weighted distribution plan. The weighted distribution plan includes a respective distribution proportion for each of the plurality of service control points.

As indicated by block 80, the method includes a step of receiving a message from a service switching point. As indicated by block 82, the message is distributed to one of the service control points in accordance with its respective distribution proportion. The one of the service control points to which the message is distributed is selected either in a deterministic manner, in a stochastic manner, or a pseudo-random manner. Thereafter, flow of the routine is directed back to block 80.

The method acts to distribute a plurality of messages so that each service control point receives a proportion of the plurality of messages commensurate with its respective distribution proportion. In addition, the plurality of messages can be either deterministically distributed or stochastically distributed to produce each respective distribution proportion.

Table IV shows an example of a weighted distribution plan for the portion of the telecommunication system illustrated in FIG. 1. In this example, of the messages received by a signal transfer point, 15% (on average) are routed to the service control point 20, 35% (on average) are routed to the service control point 22, 35% (on average) are routed to the service control point 24, and 15% (on average) are routed to the service control point 26. When a service control point is determined to be malfunctioning, its respective distribution proportion is reduced in dependence upon the severity of the condition of the service control point. For a catastrophic failure of the service control point, the distribution proportion is set to zero.

TABLE IV

| SERVICE CONTROL POINT | DISTRIBUTION PROPORTION | OCCUPANCY |
| --- | --- | --- |
| SCP1 | 15% | 47% |
| SCP2 | 35% | 60% |
| SCP3 | 35% | 60% |
| SCP4 | 15% | 47% |

Although the above-described distribution plans have been presented in terms of four service control points, it is noted that distribution plans can be formulated for any number of service control points. For example, a cluster of eight service control points can be utilized, each of which running at 70% occupancy during a peak usage period. Should one of the eight service control points fail, the remaining seven service control points pick up the extra load. As a result, the load on each of the remaining seven service control points is increased to 80% occupancy.

In general, it is preferred that the occupancy be between 40% and 80% for each of the service control points in a cluster. More preferably, the occupancy of each of the service control points in a cluster is greater than 50% during a peak usage period.

It is noted that the above-described methods can be performed by or with the assistance of a processor included with the signal transfer point. The processor is directed by software in the form of computer-readable data stored by a computer-readable storage medium to perform the steps of the above-described methods.

Thus, there has been described herein several embodiments including preferred embodiments of methods and systems for distributing messages from a signal transfer point to a plurality of service control points.

Because the various embodiments of the present invention regularly distribute messages among a cluster of service control points, they provide a significant improvement in that the service control points can be utilized with a higher occupancy level than for a mated pair configuration. As a result, a fuller utilization of service control point resources is realized without compromising quality of service should one of the service control points fail.

Additionally, the various embodiments of the present invention as herein-described provide distribution plans which are suited for a cluster of service control points having either equal or unequal processing capacities.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of distributing a plurality of messages from a signal transfer point to a plurality of service control points, the method comprising:

(a) distributing each of the plurality of messages from the signal transfer point to a corresponding one of the plurality of service control points in accordance with a distribution plan for distributing the plurality of messages among the plurality of service control points, each of the plurality of service control points being included in the distribution plan;

(b) determining that one of the plurality of service control points is malfunctioning; and (c) utilizing a modified distribution plan for distributing subsequent messages to the plurality of service control points.

2. The method of claim 1 further comprising:

(d) generating an alarm condition in response to the malfunction determined in (b).

3. The method of claim 1, wherein (b) comprises determining that one of the plurality of service control points is malfunctioning based upon a message received from one of the plurality of service control points.

4. The method of claim 3, wherein the message indicates the severity of the malfunction.

5. The method of claim 1, wherein (b) comprises determining that one of the plurality of service control points is malfunctioning based upon a duration between transferring a query message thereto and receiving a response message therefrom.

6. The method of claim 1, wherein (c) comprises omitting the service control point determined in (b) to be malfunctioning.

7. The method of claim 1, wherein (c) comprises reducing the share of messages distributed to the service control point determined in (b) to be malfunctioning.

8. The method of claim 1, wherein (c) comprises reducing the share of messages distributed to the service control point determined in (c) to be malfunctioning to zero.

9. The method of claim 1, wherein the occupancy of the plurality of service control points is greater than 50% during a peak usage period.

10. A signal transfer point operative to distribute a plurality of messages to a plurality of service control points, each of the plurality of messages being distributed to a corresponding one of the plurality of service control points in accordance with a distribution plan including each of the plurality of service control points; and operative to determine that one of the plurality of service control points is malfunctioning and to utilize a modified distribution plan for distributing subsequent messages to the plurality of service control points.

11. The signal transfer point of claim 10 further operative to determine that one of the plurality of service control points is malfunctioning based upon a message received from one of the plurality of service control points.

12. The signal transfer point of claim 10 further operative to determine that one of the plurality of service control points is malfunctioning based upon a duration between transferring a query message thereto and receiving a response message therefrom.

13. The signal transfer point of claim 10 further operative to omit the service control point determined to be malfunctioning.

14. The signal transfer point of claim 10 further operative to reduce the share of messages distributed to the service control point determined to be malfunctioning.

\* \* \* \* \*